US010832142B2

(12) United States Patent
Gordon et al.

(10) Patent No.: US 10,832,142 B2
(45) Date of Patent: Nov. 10, 2020

(54) SYSTEM, METHOD, AND RECORDING MEDIUM FOR EXPERT RECOMMENDATION WHILE COMPOSING MESSAGES

(71) Applicant: International Business Machines Corporation, Armonk, NY (US)

(72) Inventors: Michael S. Gordon, Yorktown Heights, NY (US); Stacy Fay Hobson, Poughkeepsie, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 883 days.

(21) Appl. No.: 15/186,740

(22) Filed: Jun. 20, 2016

(65) Prior Publication Data
US 2017/0364802 A1 Dec. 21, 2017

(51) Int. Cl.
*G06N 5/02* (2006.01)
*H04L 12/58* (2006.01)
*G06Q 50/00* (2012.01)

(52) U.S. Cl.
CPC ............... *G06N 5/02* (2013.01); *G06Q 50/01* (2013.01); *H04L 51/04* (2013.01); *H04L 51/14* (2013.01)

(58) Field of Classification Search
CPC ...................................................... G06N 5/02
See application file for complete search history.

(56) References Cited

U.S. PATENT DOCUMENTS

| | | | | |
|---|---|---|---|---|
| 6,829,585 B1* | 12/2004 | Grewal | ................. | G06Q 10/02 705/7.14 |
| 6,938,068 B1* | 8/2005 | Kraft | ..................... | G06Q 10/10 709/203 |
| 7,120,647 B2* | 10/2006 | Venkatesh | ............. | G06Q 10/10 706/60 |
| 8,805,756 B2* | 8/2014 | Boss | ................. | G06F 17/30976 706/12 |
| 2010/0205541 A1* | 8/2010 | Rapaport | ............... | G06Q 10/10 715/753 |
| 2012/0185777 A1* | 7/2012 | Banerjee | ............. | G06F 3/04847 715/738 |
| 2012/0290950 A1* | 11/2012 | Rapaport | ................ | H04L 51/32 715/753 |
| 2013/0054509 A1* | 2/2013 | Kass | ..................... | G06Q 10/00 706/55 |

(Continued)

OTHER PUBLICATIONS

S. Kichuk and W. Wiesner, "The Big Five personality factors and team performance: implications for selecting successful product design teams", J. Eng. Technol. Manage. 14, 1997, pp. 195-221. (Year: 1997).*

*Primary Examiner* — Vincent Gonzales
(74) *Attorney, Agent, or Firm* — Anthony Curro, Esq.; McGinn IP Law Group, PLLC

(57) ABSTRACT

An expert recommendation method, system, and non-transitory computer readable medium, include a topic extraction circuit configured to extract a topic of a user input message in real-time, an expert recommending circuit configured to recommend a list including a plurality of experts based on the extracted topic, and an expert ranking circuit configured to order the experts on the list of experts based on an expert rank factor.

19 Claims, 5 Drawing Sheets

(56) References Cited

U.S. PATENT DOCUMENTS

| | | | |
|---|---|---|---|
| 2013/0077775 A1* | 3/2013 | Fan | H04M 3/5166 379/265.09 |
| 2014/0101085 A1* | 4/2014 | Lu | G06N 5/02 706/46 |
| 2014/0181098 A1* | 6/2014 | Bhandari | G06F 17/30722 707/728 |

* cited by examiner

SYSTEM, METHOD, AND RECORDING MEDIUM FOR EXPERT RECOMMENDATION WHILE COMPOSING MESSAGES

BACKGROUND

The present invention relates generally to an expert recommendation system, and more particularly, but not by way of limitation, to a system for recommending experts in real-time based on an extracted topic of a message while the message is being composed.

Conventional expert recommendation techniques generally mine the text of a completed document and provide a list of experts based on the mined data topics. However, these conventional techniques are done based on completed documents and the documents being specifically sent into a data mining program on a request.

However, there is a technical problem in the conventional techniques in that when an expert is needed, an individual either consults a user input list or a computer-generated list that has been prepared and updated over the years or relies on associates to share their contacts. Either method of expert retrieval is outdated and limited in its information and reliability. Also, the expert lists are static in that the user or system creating the list does not dynamically rank the experts based on any alternative factors other than the topical context of the text.

SUMMARY

In view of the technical problem, the inventors have considered a non-abstract improvement to a computer technology via a technical solution to the technical problem in which a system can recommend an expert in real-time while a user is composing a message based on an extracted topic of the message and dynamically updating a ranking of the experts provided.

In an exemplary embodiment, the present invention can provide an expert recommendation system, including a topic extraction circuit configured to extract a topic of a user input message in real-time, an expert recommending circuit configured to recommend a list including a plurality of experts based on the extracted topic, and an expert ranking circuit configured to order the experts on the list of experts based on an expert rank factor.

Further, in another exemplary embodiment, the present invention can provide an expert recommendation method, including extracting a topic of a user input message in real-time, recommending a list including a plurality of experts based on the extracted topic, and ordering the experts on the list of experts based on an expert rank factor.

Even further, in another exemplary embodiment, the present invention can provide a non-transitory computer-readable recording medium recording a expert recommendation program, the program causing a computer to perform: extracting a topic of a user input message in real-time, recommending a list including a plurality of experts based on the extracted topic, and ordering the experts on the list of experts based on an expert rank factor.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
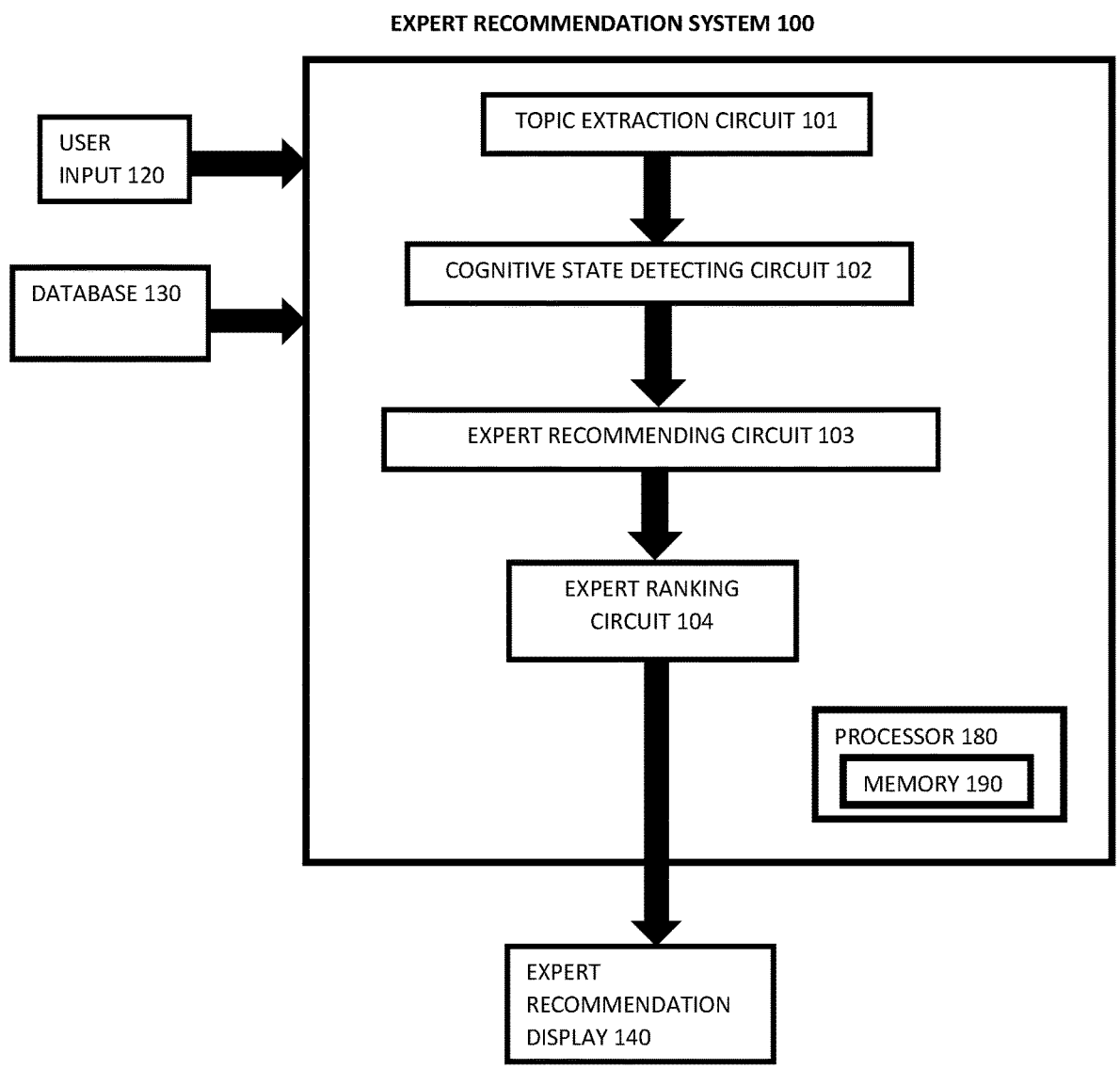
FIG. 1 exemplarily shows a block diagram illustrating a configuration of an expert recommendation system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the expert recommendation system 100 includes a topic extraction circuit 101, a cognitive state detecting circuit 102, an expert recommending circuit 103, and an expert ranking circuit 104. The expert recommendation system 100 includes a processor 180 and a memory 190, with the memory 190 storing instructions to cause the processor 180 to execute each circuit of the expert recommendation system 100. The processor and memory may be physical hardware components, or a combination of hardware and software components.

Although the expert recommendation system 100 includes various circuits, it should be noted that an expert recommendation system can include modules in which the memory 190 stores instructions to cause the processor 180 to execute each module of the expert recommendation system 100.

Also, each circuit can be a stand-alone device, unit, module, etc. that can be interconnected to cooperatively produce a transformation to a result.

With the use of these various circuits, the expert recommendation system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 3:
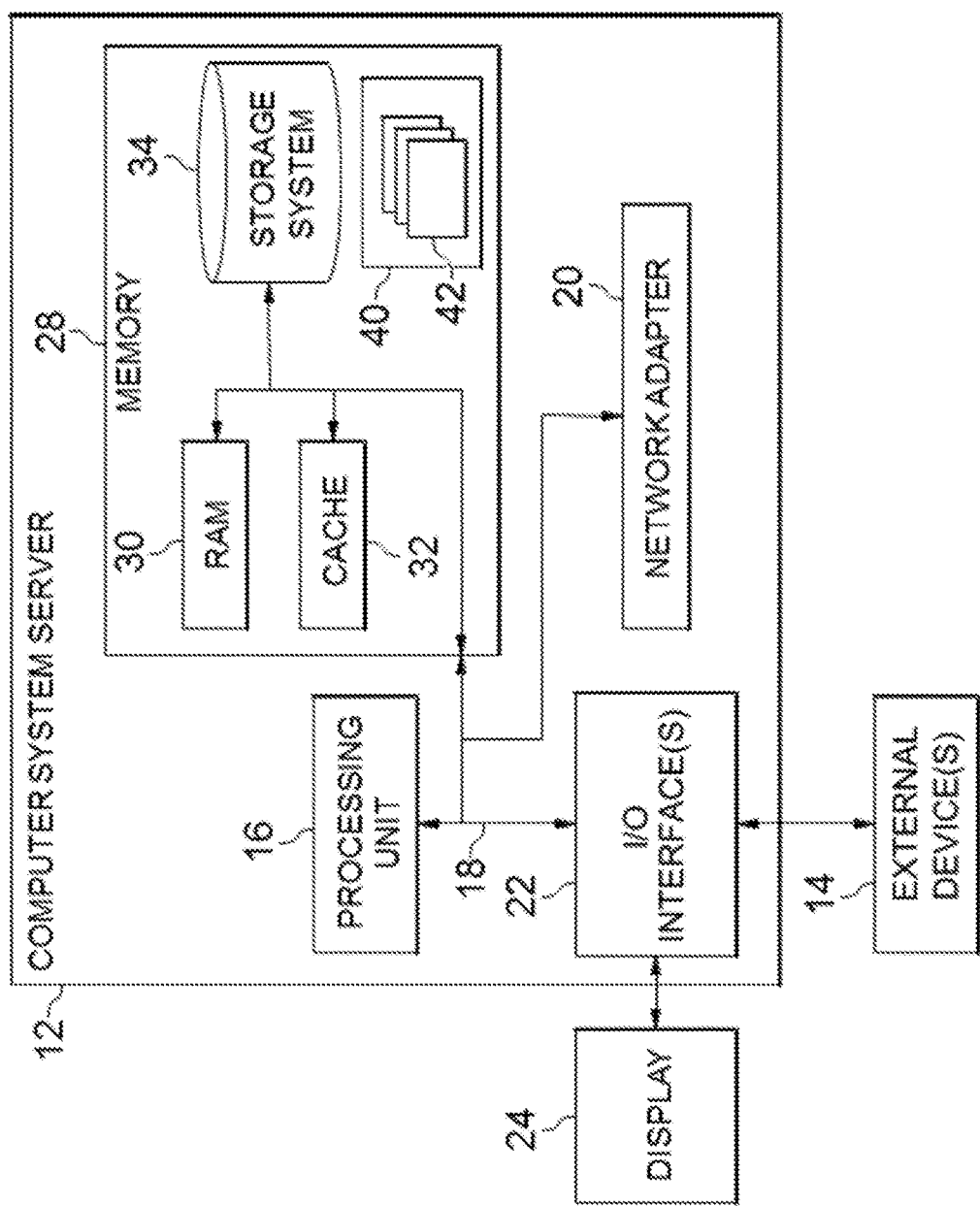
FIG. 3 depicts a cloud computing node 10 according to an exemplary embodiment of the present invention.
Figure 4:
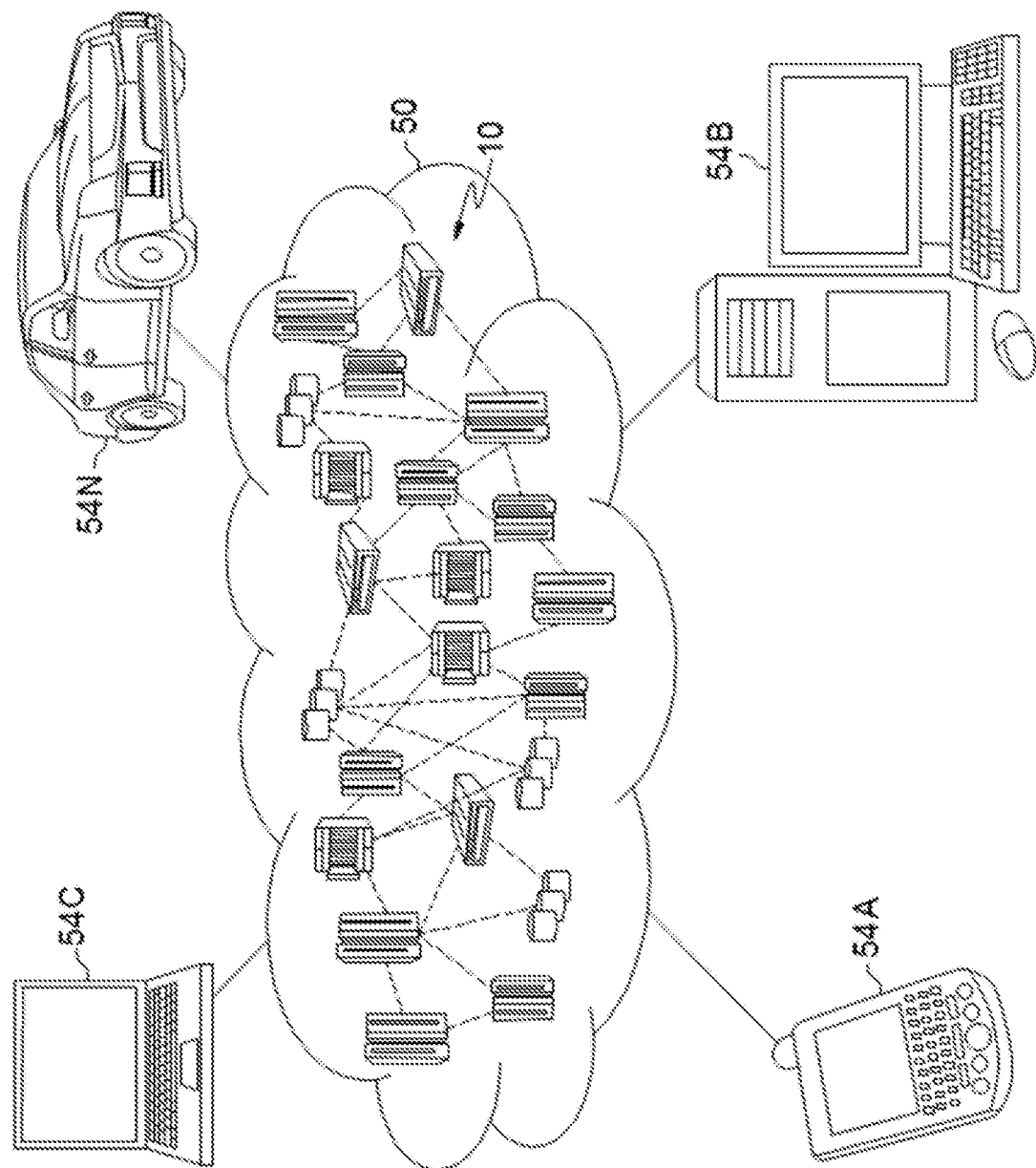
FIG. 4 depicts a cloud computing environment 50 according to another exemplary embodiment of the present invention.
Figure 5:
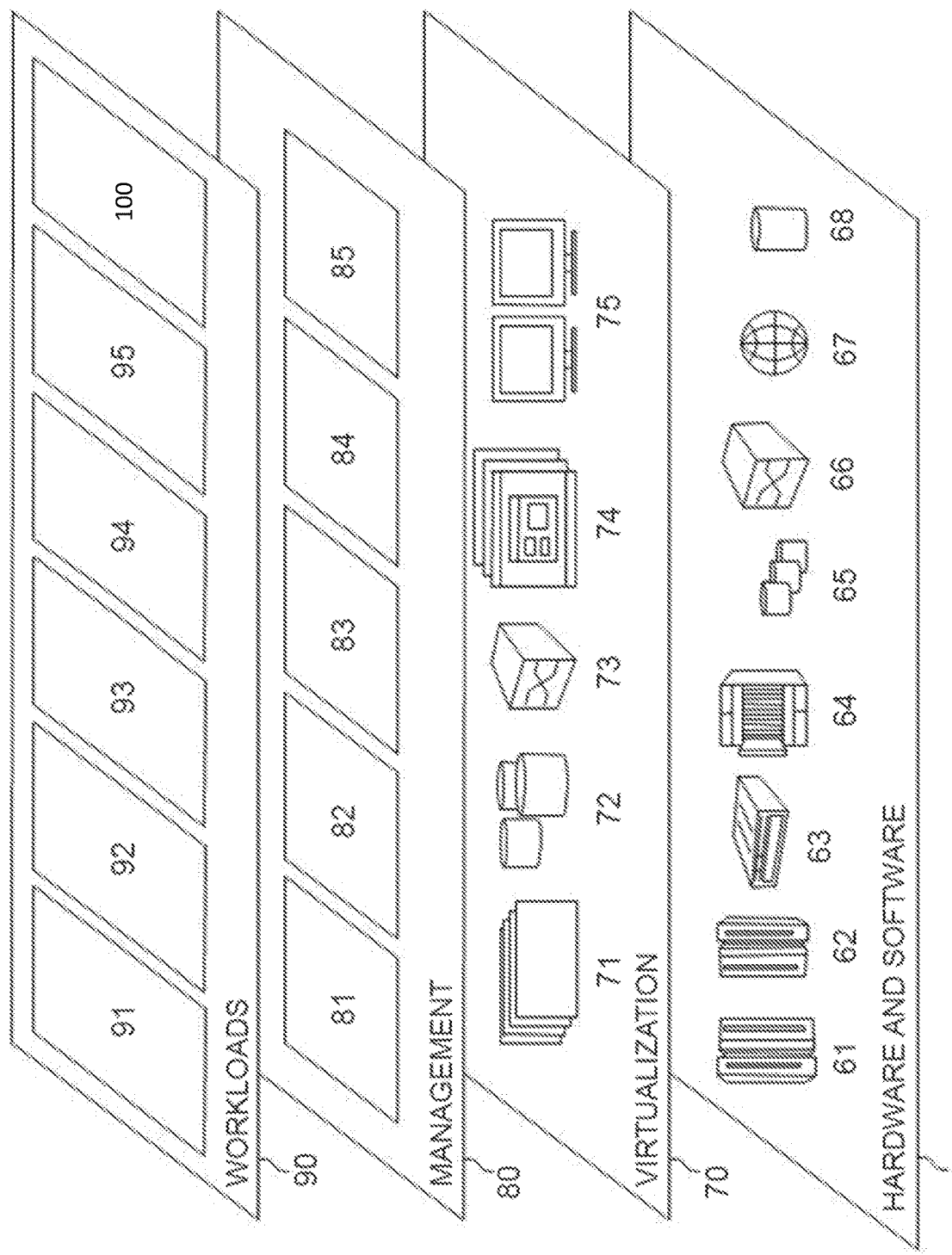
FIG. 5 depicts abstraction model layers according to an exemplary embodiment of the present invention.

Although as shown in FIGS. 3-5 and as described later, the computer system/server 12 is exemplarily shown in cloud computing node 10 as a general-purpose computing circuit which may execute in a layer the expert recommendation system 100 (FIG. 5), it is noted that the present invention can be implemented outside of the cloud environment.

The expert recommendation system 100 receives a user input 120 in the form of text input or audio input that is converted to text. The user input 120 can be, for example, email, instant message, smartphone chat, a word document, a collaborated file, a text file, etc.

Based on the user input 120, the topic extraction circuit 101 extracts a topic in real-time. That is, as the user is composing the message, speaking, inputting a message, the topic extraction circuit 101 continuously analyzes the text (speech-to-text) for the topic of the text. Also, the topic extraction circuit 101 can extract a plurality of topics in real-time from the user input 120 (e.g., a topic of airplanes may extract a topic of drag and stability control which require two different types of experts potentially).

The topic extraction circuit 101 can extract the topic using techniques such as a singular value decomposition, a latent semantic analysis (LSA), a Latent Dirichlet Allocation for topic analysis, etc.

The user input 120 can be composed by a user using a text editor (e.g. a user who is writing a manual, book, article, technical paper, etc.), composing a Web page, etc.

Information on experts (and users) is stored in a database 130 associated with an organization, department, company, social network, expertise, publications, presentations, a cognitive profile of the expert, experience of the expert, etc.

The cognitive state detecting circuit 102 detects a cognitive state of the user and a cognitive state of the experts in real-time or based on a profile. That is, the recommendation and ranking of experts by the expert recommending circuit 103 and the expert ranking circuit 104 (as described later) may be based on a user mood, expert mood, a user cohort (e.g., autism, Alzheimer's, Asperger's, etc.), an expert cohort, or a real-time cognitive state of the user and expert (e.g., angry, sad, patient, stressed, etc.). The cognitive state detecting circuit 102 can utilize various known approaches for estimating a cognitive state or mood, with a confidence level and this information may aid in the assessment of a person.

The cognitive state detecting circuit 102 can measure, for example, a level of distraction of a person based on the number of open tasks on a computer desktop, amount of task shifting, whether the phone is ringing, whether people are nearby, user's speech or gestures, etc.

The expert recommending circuit 103 recommends a list of expert(s) based on the topic extracted by the topic extraction circuit 101 and the information on the exports stored in the database 130. The expert recommending circuit 103 outputs an expert recommendation display 140 in real-time on the device into which the user is inputting the user input 120 into.

The presentation of the expert recommendation display 140 can be, for example, selectable images of subject-matter experts at the side of an input client interface, presenting names of experts, presenting avatars of experts, interactive interface such that selecting the presentation of the expert (e.g. with a mouse, touch, or the like) triggers a communication exchange with the expert, etc. Preferably, the expert recommendation display 140 is displayed in an area of the input client interface that does not interfere with the user input 120 such that the user can continue to type a message and view the list of recommended experts. Alternatively, the presentation of the expert recommendation display 140 can be, for example, a list of references (publications) with links thereto by the expert without triggering a dialogue with the expert.

That is, the presentation of the expert recommendation display 140 can be a real-time expert presentation on a graphical user interface (GUI) while the user is composing the message (e.g., email, piece of code, article, manual, etc.), and the expert recommendation display 140 changes as the document content on-screen evolves (e.g., the user composes more of the message) or the message is scrolled through. For example, experts in the form of names or photos can move in and out of existence in a dynamic fashion at the side of a GUI (or window frame) of the display.

Based on the cognitive state detecting circuit 102 detecting within a certain confidence level that the user is becoming, for example, impatient with a lack of response from experts, a lack of experts populating the expert recommendation list, etc., the expert recommending circuit 103 can trigger a signal sent to a group of people, or community to solicit input from the group. Thus, the expert recommending circuit 103 can assure an expert will be recommended before the user is too agitated or impatient.

The expert ranking circuit 104 ranks and orders the experts on the list of experts based on predetermined expert ranking factors. That is, the order of the experts being displayed is changed based on the expert ranking circuit 104 determining the rank of the expert with a highest ranking expert being first on the list.

The expert ranking circuit 104 can rank the experts based on a social network analysis, a number of times a user has previously corresponded with the expert, a consideration of language fluency of the expert versus the user (e.g., French vs English), a number of publications by the expert, a number of presentations by the expert, etc.

Also the rank can be based on an expert being ranked higher for a topic if the expert ranking circuit 104 determines that the expert has discussed the area of the topic using a variety of different concepts, which is interpreted as a signal that the experts has a deeper (e.g., greater than average) understanding of a subject (e.g. in the expert's writing such as technical papers). In other words, the ranking can be based on an overall knowledge factor of the expert.

The ranking can be done according to the expert being active in a dialogue at a number of meetings on a particular topic (e.g., which may be discovered from the database 130). An expert who has attended more meetings would be ranked higher.

The ranking by the expert ranking circuit 104 can also be done based on a social network the expert is part of. The social network can be analyzed according to a measure of network centrality, including, a Degree centrality, a Closeness centrality, a Betweenness centrality, an Eigenvector centrality, a Katz centrality and PageRank, a Percolation centrality, a Cross-clique centrality, a Freeman Centralization, etc. Hubs and authorities may also be considered. That is, if an expert is part of a larger social network such that if the expert is chosen and does not know the answer, the expert may be able to quickly get an answer through the expert's social network from another expert. Therefore, the expert ranking circuit 104 can rank an expert as part of a large social network potentially higher than an expert that does not have as many social network connections.

The expert ranking circuit 104 can further rank experts based on a speed (timing) of the expert answering (response) prior requests from the user. Thus, an expert that gives an immediate answer (response) can be ranked higher than an expert having more knowledge on the topic but takes more time to answer (response).

It is noted that the list of experts can also include experts in the form of an artificial intelligent agent. That is, some users, based on the cognitive state or the cohort of the user (e.g., Asperger's) may prefer to communicate with an artificial intelligent agent instead of a human expert. Thus, the expert ranking circuit 104 can consider the cohort of the user or user preferences and rank the artificial intelligent agent higher than the human expert.

Also, the database 130 can include feedback on experts such as helpfulness of an expert, thoughtfulness of an expert, response time and the expert ranking circuit 104 can rank the experts based on the user feedback.

Further, since many users may be accessing the expert recommendation system 100 at a same time, the expert ranking circuit 104 can alternatively rank the experts based on the experts not being on another expert recommendation display 140 at the current time. In this manner, the expert ranking circuit 104 can prevent a particular expert from being overwhelmed by requests while allowing the user access to an expert with a higher chance of responding.

The expert ranking circuit 104 can also rank the experts based on a parings of experts with users according to the cognitive state detected by the cognitive state detecting circuit 102 either in real-time or from a profile of the user and expert in the database 130.

That is, the cognitive state detecting circuit 102 determines with a certain level of confidence that a user has a particular cognitive state (e.g., the user is becoming impatient, nervous, etc.), and the expert ranking circuit 104 considers that when the user has a certain cognitive state, an expert with a cognitive state that would match well (i.e., be compatible) with the user's cognitive state is ranked higher on the list of experts. Also, the experts (or users) can control their respective profile to control the ranking that a user sees, based on the user's state (e.g. angry) such that the expert can avoid being recommended to users with certain cognitive states. For example, if the user is agitated, an expert that is currently patient or historically patient based on the expert profile of the database 130 can be ranked higher than an expert would is also currently agitated.

For example, it is possible that a person with slight autism may prefer to see experts with a similar or complementary condition ranked slightly higher. Also, the expert ranking circuit 104 can learn if this similar/complementary approach is not useful for a particular user and change this so that the person with autism may see experts higher ranked who have had "experience" with people on the autism spectrum. Also, the user can set up a profile looking for particular cognitive states or personality traits in an expert to be ranked higher.

Thus, as the user input 120 is received by the system 100, the system 100 outputs an expert recommendation display 140 in real-time such that the user can ask an expert for help, advice, etc. for the topic the user is writing about.

Also, when a user uses the system 100, the user may or may not request actual assistance in real time interactions. For example, if desired, the first to respond could actually be a (person or team) who is "hidden" behind an icon. Or, if desired, upon completion of any interchange, the requester may rate the exchange (e.g. in terms of satisfaction) and the rating stored in the database 130.

In a second embodiment, the expert recommendation system 100 can be applied to a text document being read by a user or an audio file being played for the user. Thus, if a user is reading a document, the expert recommendation display 140 can be displayed at the side of the document as the topic the user is reading is detected by the topic extraction circuit 101 and continuously evolves due a user scrolling or paging through a document or listening to different portions of an audio file.

For example, if a user is reading an article on cloud computing, various expert recommendation displays 140 can be displayed into view as the topics change through sections of an article.

Figure 2:
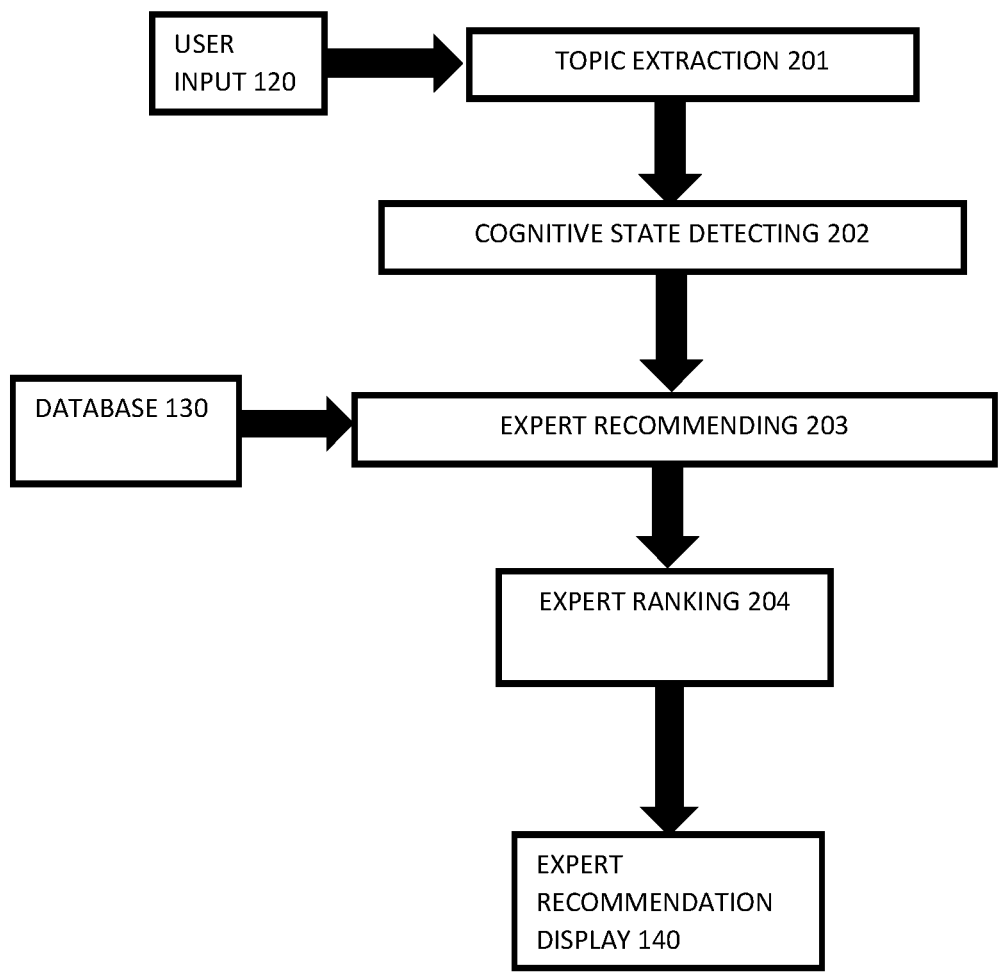
FIG. 2 exemplarily shows a high level flow chart for an expert recommendation method 200.

FIG. 2 shows a high level flow chart for a method 200 of expert recommendation.

Step 201 extracts a topic of the user input 120.

Step 202 detects a cognitive state of the user as the user is composing the user input 120.

Step 203 recommends a list of expert(s) based on the extracted topic and experts expertise stored in a database 130.

Step 204 ranks and orders the experts on the list of experts based on predetermined expert ranking factors such that the list of experts is optimal for the user.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based email) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the expert recommendation system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An expert recommendation system, comprising:
    a topic extraction circuit configured to extract a topic of a user input message in real-time;
    an expert recommending circuit configured to recommend a list including a plurality of experts based on the extracted topic; and
    an expert ranking circuit configured to order the experts on the list of experts based on an expert rank factor and similar or complimentary conditions between a personality trait of the experts and a personality trait of a user that inputs the user input message,
    wherein the expert recommending circuit displays the list including the plurality of experts as a real-time expert recommendation display via a graphical user interface such that the expert recommendation display dynamically changes as the user views a different portion of the message on a display screen and the topic extraction circuit extracts the topic of the user input message of the different portion being currently viewed, and
    wherein the expert recommending circuit displays the list including the plurality of experts as a real-time expert recommendation display via the graphical user interface such that each expert is selectable which triggers an instant communication with the expert.

2. The system of claim 1, wherein the user input message is input by at least one of:
    an e-mail;
    a collaborated message using a collaboration tool;
    a completed text file;
    an article;
    a document uploaded by the user;
    an instant message;
    a smartphone chat; and
    a speech-to-text convertor.

3. The system of claim 1, wherein the expert recommending circuit displays the list including the plurality of experts as the real-time expert recommendation display via the graphical user interface such that the expert recommendation display dynamically changes as the user input changes.

4. The system of claim 3, wherein the graphical user interface is disposed in a periphery of the display screen of a device that receives the user input.

5. The system of claim 1, wherein the list including the plurality of experts comprises an expert recommendation display including at least one of:
    a selectable image for each of the experts;
    a name-only display of each of the experts; and
    an avatar for each of the experts.

6. The system of claim 1, wherein the expert ranking circuit calculates the expert rank factor based on at least one of:
    a language fluency match between the user and the expert;
    a number of times the user has previously corresponded with the expert; and
    a social network of the expert, the social network of the expert being analyzed based on a measure of network centrality.

7. The system of claim 1, wherein the expert rank factor for a first expert is greater than that of a second expert if the expert ranking circuit determines that the first expert has discussed a topic area similar to the topic extracted by the topic extraction circuit.

8. The system of claim 1, wherein the expert rank factor is based on a number of expert presentations and publications of the expert.

9. The system of claim 1, wherein the expert rank factor is based on a response time of each of the experts, a first expert having a faster response time than that of a second expert having a greater expert rank factor.

10. The system of claim 1, wherein the plurality of experts includes an artificial intelligent agent.

11. The system of claim 1, wherein the expert rank factor is based on a rating for the expert according to past interactions with a user.

12. The system of claim 1, further comprising a cognitive state detecting circuit configured to detect a cognitive state of the user and a cognitive state of each of the experts,
    wherein the expert ranking circuit determines a greater expert rank factor based on the cognitive state of the user being compatible with the cognitive state of the expert.

13. The system of claim 1, further comprising a cognitive state detecting circuit configured to detect a cognitive cohort of the user and a cognitive cohort of each of the experts,
    wherein the expert rank factor is based on a compatibility of traits of the cognitive cohort of the user and those of the cognitive cohort of the expert.

14. The system of claim 1, further comprising a cognitive state detecting circuit configured to detect a cognitive state of the user,
    wherein the expert recommending circuit excludes an expert from being recommended based on the expert pre-deciding not to be recommended to a particular user having a certain cognitive state.

15. The system of claim 1, further comprising a cognitive state detecting circuit configured to detect a cognitive state of each of the experts,
    wherein the expert recommending circuit excludes an expert from being recommended based on the user pre-deciding not to include experts with a certain cognitive state in the list of experts.

16. The system of claim 1, further comprising a cognitive state detecting circuit configured to detect a current cognitive state of the user and a current cognitive state of each of the experts,
    wherein the current cognitive state of the user and the current cognitive state of each of the experts are stored in a database such that the expert recommending circuit recommends the list including the plurality of experts based on the stored cognitive states of the user and the stored cognitive states of each of the experts.

17. The system of claim 1, wherein an identity of each expert is hidden from the user to remove bias from an evaluation of the expert.

18. An expert recommendation method, comprising:
- extracting a topic of a user input message in real-time;
- recommending a list including a plurality of experts based on the extracted topic; and
- ordering the experts on the list of experts based on an expert rank factor and similar or complimentary conditions between a personality trait of the experts and a personality trait of a user that inputs the user input message,
- wherein recommending further displays the list including the plurality of experts as a real-time exert-recommendation display via a graphical user interface such that recommending dynamically changes as the user views a different portion of the message on a display screen and the topic extraction circuit extracts the topic of the user input message of the different portion being currently viewed, and
- wherein recommending displays the list including the plurality of experts as a real-time expert recommendation display via the graphical user interface such that each expert is selectable which triggers an instant communication with the expert.

19. A non-transitory computer-readable recording medium recording a expert recommendation program, the program causing a computer to perform:
- extracting a topic of a user input message in real-time;
- recommending a list including a plurality of experts based on the extracted topic; and
- ordering the experts on the list of experts based on an expert rank factor and similar or complimentary conditions between a personality trait of the experts and a personality trait of a user that inputs the user input message,
- wherein recommending further displays the list including the plurality of experts as a real-time expert recommendation display via a graphical user interface such that recommending dynamically changes as the user views a different portion of the message on a display screen and the topic extraction circuit extracts the topic of the user input message of the different portion being currently viewed, and
- wherein recommending displays the list including the plurality of experts as a real-time expert recommendation display via the graphical user interface such that each expert is selectable which triggers an instant communication with the expert.

* * * * *